(12) United States Patent
Chen et al.

(10) Patent No.: US 11,656,356 B2
(45) Date of Patent: May 23, 2023

(54) RANGING METHOD BASED ON LASER RADAR SYSTEM, DEVICE AND READABLE STORAGE MEDIUM

(71) Applicant: Apollo Intelligent Driving Technology (Beijing) Co., Ltd., Beijing (CN)

(72) Inventors: Jiajia Chen, Beijing (CN); Ji Wan, Beijing (CN); Tian Xia, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 927 days.

(21) Appl. No.: 16/511,456

(22) Filed: Jul. 15, 2019

(65) Prior Publication Data
US 2019/0353790 A1 Nov. 21, 2019

(30) Foreign Application Priority Data
Sep. 12, 2018 (CN) .......................... 201811062793.4

(51) Int. Cl.
| | |
|---|---|
| *G01S 17/42* | (2006.01) |
| *G01S 17/04* | (2020.01) |
| *G01S 17/931* | (2020.01) |

(52) U.S. Cl.
CPC .............. *G01S 17/42* (2013.01); *G01S 17/04* (2020.01); *G01S 17/931* (2020.01)

(58) Field of Classification Search
CPC .......... G01S 17/86; G01S 7/497; G01S 17/08; G01S 17/04; G01S 7/003
See application file for complete search history.

(56) References Cited

U.S. PATENT DOCUMENTS

| | | | |
|---|---|---|---|
| 2003/0137449 A1* | 7/2003 | Vashisth ................ | G01C 11/02 342/357.31 |
| 2009/0048750 A1 | 2/2009 | Breed | |

(Continued)

FOREIGN PATENT DOCUMENTS

| | | |
|---|---|---|
| CN | 104463163 A | 3/2015 |
| CN | 107169986 A | 9/2017 |

(Continued)

OTHER PUBLICATIONS

Huang et al., "Lidar Based Dynamic Obstacle Detection, Tracking and Recognition Method for Driverless Cars", Jul. 2016, pp. 437-443, vol. 38, No. 4.

(Continued)

*Primary Examiner* — Mirza F Alam
(74) *Attorney, Agent, or Firm* — Harness, Dickey & Pierce, P.L.C.

(57) ABSTRACT

A ranging method based on a laser radar system, a device and a readable storage medium are provided. The ranging method includes receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method can realize a ranging calibration task for a larger distance range, thereby effectively improving a calibration efficiency and accuracy of the visual image algorithm, compared with the existing method of ranging calibration of the visual image algorithm by a single laser radar.

14 Claims, 4 Drawing Sheets

(56) References Cited

U.S. PATENT DOCUMENTS

| | | | | |
|---|---|---|---|---|
| 2017/0371348 A1* | 12/2017 | Mou | ................... | G01S 17/87 |
| 2019/0354782 A1* | 11/2019 | Kee | ................... | G06V 20/58 |
| 2020/0219316 A1* | 7/2020 | Baik | ................... | G06T 17/10 |
| 2021/0009166 A1* | 1/2021 | Li | ................... | G06N 3/0445 |

FOREIGN PATENT DOCUMENTS

| | | |
|---|---|---|
| CN | 107329145 A | 11/2017 |
| CN | 108318895 A | 7/2018 |
| EP | 3318894 A1 | 5/2018 |
| JP | H07271434 A | 10/1995 |
| JP | 2004191095 A | 7/2004 |
| JP | 2005077130 A | 3/2005 |
| JP | 2009093308 A | 4/2009 |
| JP | 2013109325 A | 6/2013 |
| JP | 2016125897 A | 7/2016 |
| JP | 2017106749 A | 6/2017 |
| JP | 2017166846 A | 9/2017 |

OTHER PUBLICATIONS

Darms et al., "Obstacle Detection and Tracking for the Urban Challenge", IEEE Transactions on Intelligent Transportation Systems, Sep. 2009, pp. 475-485, vol. 10, No. 3.

First Japanese Office Action for corresponding Application No. 2019130310 dated Jul. 21, 2020.

First Chinese Office Action for corresponding Application No. 201811062793.4 dated Aug. 5, 2020.

\* cited by examiner too long munication, where the plurality of laser radars include a fixedly installed laser radars and/or a laser radar installed on each unmanned device.

In an optional embodiment, the ranging data further includes time stamps of the laser radars, where the time stamps is used to indicate moments when distances are obtained by measuring via the laser radars; and the processing module is specifically configured to establish a three-dimensional coordinate model at each moment according to a time stamp of each ranging data.

In an optional embodiment, the plurality of laser radars include a target laser radar installed on the target unmanned device; and the processing module is specifically configured to establish a three-dimensional coordinate system with a location of the target unmanned device as an origin, according to a target ranging data obtained by the target laser radar installed on the target unmanned device; and determine a coordinates of other laser radar and a coordinate of each obstacle in a measurement range of the other laser radar according to other ranging data except the target ranging data in the ranging data, to obtain a three-dimensional coordinate model; where the other laser radar is a laser radar except the target laser radar among the plurality of laser radars of the laser radar system.

In an optional embodiment, after the distance between the target unmanned device and each obstacle according to the three-dimensional coordinate model is determined, the communication module is further configured to send the distance between the target unmanned device and each obstacle to the target unmanned device, so that the target unmanned device performs ranging calibration on a visual image algorithm according to the distance.

In an optional embodiment, before receiving the ranging data obtained by measuring via the plurality of laser radars of the laser radar system, the communication module is further configured to send a ranging instruction including a synchronous clock signal to each laser radar of the laser radar system so that each laser radar performs ranging according to the synchronous clock signal on basis of the received ranging instruction.

In an optional embodiment, the communication module is configured to send the ranging instruction to each laser radar according to a preset time period.

In still another aspect, the present disclosure provides a ranging device based on a laser radar system, including: a memory, a processor coupled to the memory, and a computer program stored on the memory and runnable on the processor, where any one of the methods of the first aspect above is executed when the processor runs the computer program.

In a final aspect, the present disclosure provides a readable storage medium, including a program, and when the program is executed on a terminal, the terminal executes any one of the preceding methods.

The ranging method based on a laser radar system, device and readable storage medium provided in the present disclosure involve receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method of establishing a three-dimensional coordinate model by using ranging data measured by a plurality of laser radars, and determining a distance between a target unmanned driving device and an obstacle according to the three-dimensional coordinate model, of the present application can realize a ranging calibration task for a larger distance range, thereby effectively improving a calibration efficiency and accuracy of the visual image algorithm, compared with the existing method of ranging calibration of the visual image algorithm by a single laser radar.

BRIEF DESCRIPTION OF DRAWINGS

Embodiments of the present disclosure have been shown by the accompanying drawings, and will be described in more detail below. The drawings and corresponding descriptions are not intended to limit the scope of the present disclosure in any way, but to illustrate the concept of present disclosure to the skilled in the field by reference to specific embodiments.

The accompanying drawings herein are incorporated in the specification and form part of the specification, illustrating embodiments that conform to the present disclosure and, together with the specification, explaining the principle of the present disclosure.

DESCRIPTION OF EMBODIMENTS

In order to make purposes, technical solutions and advantages of embodiments of the present disclosure clearer, the technical solutions of the embodiments of the present disclosure will be clearly and completely described in the following with reference to the accompanying drawings.

With the development of science and technology and the advancement of society, autonomous driving technology has become a development trend in the field of transportation. When an unmanned device performs an automatic driving task, it is often necessary to capture the environment around the unmanned device by using a camera disposed on the unmanned device, and use a visual image algorithm to calculate a distance between an obstacle in the environment and the unmanned device so as to adjust an automatic driving strategy of the unmanned device.

However, since the visual image algorithm is an empirical algorithm, when the visual image algorithm is used to calculate the distance between the obstacle in the environment and the unmanned device, an accuracy of the calculated distance cannot be guaranteed. Therefore, in the prior art, a method of installing a laser radar on the unmanned device is adopted so as to use laser radar ranging to provide a calibration of ranging accuracy of the visual image algorithm.

However, based on a difference in ranging principle, a measurement range of the existing laser radar ranging device is much smaller than a range that can be measured by the visual image algorithm, which makes that when the laser radar ranging device is used to perform calibration of ranging accuracy on the visual image algorithm, the ranging range that can be calibrated is small, which cannot meet requirements of ranging calibration of the unmanned device.

Figure 1:
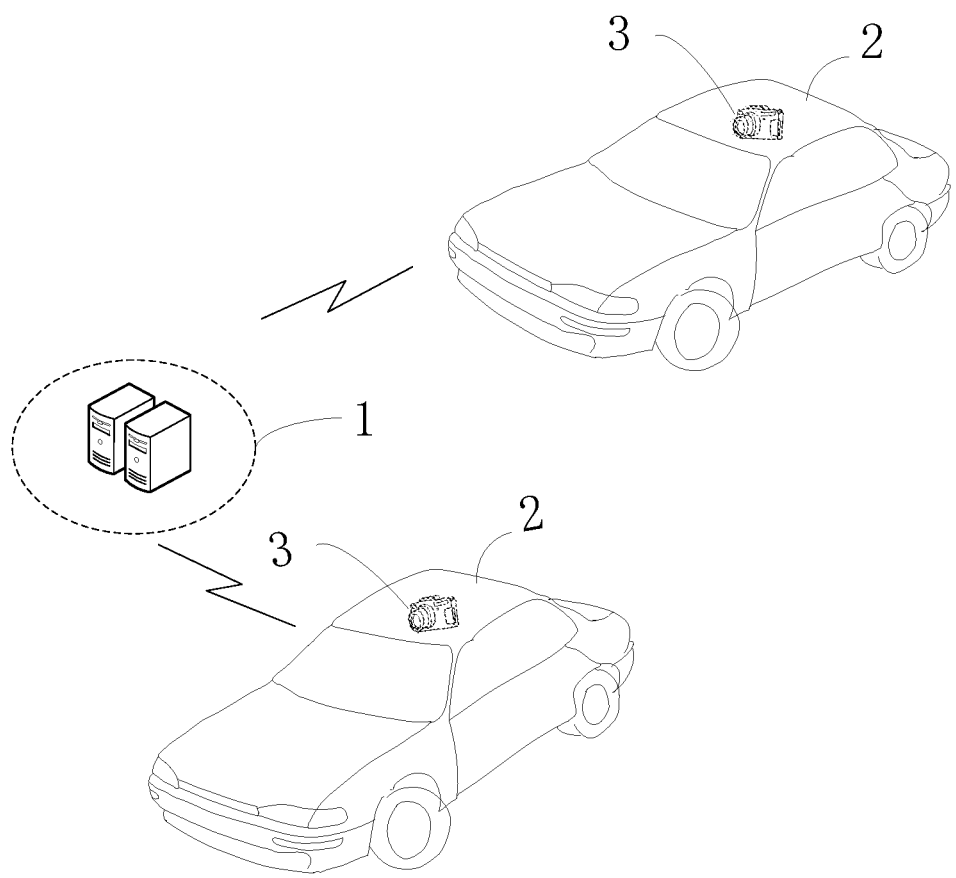
FIG. 1 is a schematic diagram of a network architecture on which the present disclosure is based.

It should be noted that, in order to better explain the present disclosure, FIG. 1 is a schematic diagram of a network architecture on which the present disclosure is based. As shown in FIG. 1, an execution body of the ranging method based on a the laser radar system provided by the present disclosure may specifically be a ranging device 1 based on a laser radar system, network architecture on which the ranging device 1 based on a laser radar system is based further includes an unmanned device 2 and a laser radar system 3.

Where the ranging device 1 based on a laser radar system can be implemented by hardware and/or software, and specifically can perform communication connection and data interaction with the laser radar system 3 including a plurality of laser radars so as to receive a ranging data obtained by measuring via the laser radar system 3. The ranging device 1 based on a laser radar system can also perform communication connection and data interaction with the unmanned device 2 so as to provide the unmanned device 2 with corresponding distance information that can be used to calibrate a visual image algorithm set in the unmanned device 2.

Figure 2:
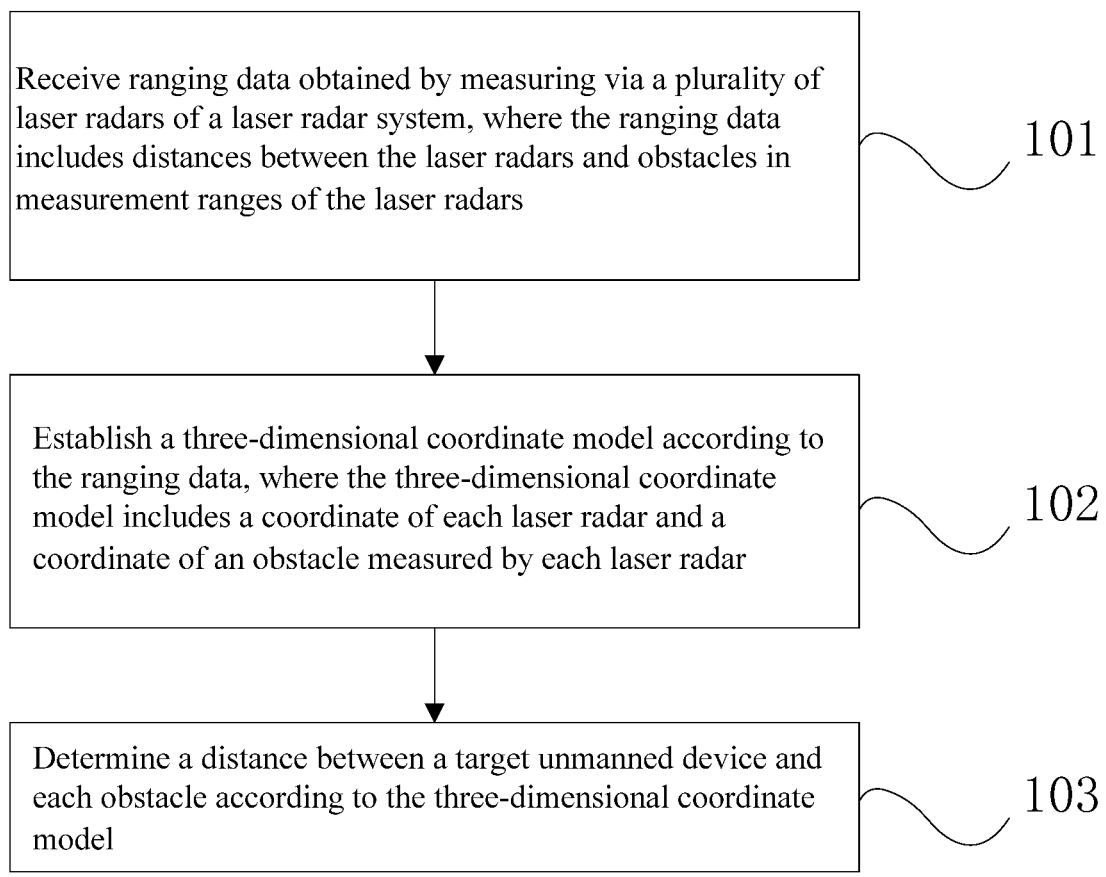
FIG. 2 is a schematic flow chart of a ranging method based on a laser radar system according to Embodiment I of the present disclosure.

FIG. 2 is a schematic flow chart of a ranging method based on a laser radar system according to Embodiment I of the present disclosure.

As shown in FIG. 2, the ranging method based on a laser radar system includes:

Step 101: receive ranging data obtained by measuring via a plurality of laser radars of a laser radar system, where the ranging data includes distances between the laser radars and obstacles in measurement ranges of the laser radars.

Step 102: establish a three-dimensional coordinate model according to the ranging data, where the three-dimensional coordinate model includes a coordinate of each laser radar and a coordinate of an obstacle measured by each laser radar.

Step 103: determine a distance between a target unmanned device and each obstacle according to the three-dimensional coordinate model.

In order to solve the above-mentioned problem that since the measurement range of the existing laser radar ranging device is much smaller than the distance range measured by a visual image algorithm, when the laser radar ranging device is used to perform calibration of ranging accuracy on the visual image algorithm, the calibrated ranging range cannot be matching and calibration efficiency is low, the present disclosure provides a ranging method based on a laser radar system.

It should be noted that the laser radar system based on the present embodiment includes a plurality of laser radars, and each of which can independently perform a ranging task. Where the plurality of laser radars may include a fixedly installed laser radar and/or a laser radar installed on each unmanned device.

Firstly, a ranging device based on laser radar will receive the ranging data obtained by measuring via each laser radar, where the ranging data sent by each laser radar includes a distance between each laser radar itself and each obstacle obtained by measuring via each laser radar within its measurement range.

Subsequently, a three-dimensional coordinate model can be established according to the obtained distances, where the three-dimensional coordinate model includes a coordinate of each laser radar and a coordinate of an obstacle measured by each laser radar. Finally, a distance between a target unmanned device and each obstacle can be determined according to the three-dimensional coordinate model.

Specifically, in the present application, since a laser radar system including a plurality of laser radars is used for ranging, and the plurality of laser radars are located at different positions, a three-dimensional coordinate model can be established by obtaining ranging data measured by the laser radars, where the three-dimensional coordinate model may include a coordinate of each laser radar and its measurable obstacle. Of course, when establishing the three-dimensional coordinate model, it is necessary to combine each ranging data so as to determine a coordinates of the same obstacle or the same laser radar; that is, for a certain obstacle, distances measured by different laser radars are different. Therefore, when integrating the ranging data, it is possible to refer to obstacles whose distances are measured by the plurality of laser radars so as to achieve establishment of the three-dimensional coordinate model, thereby obtaining a position system with a large ranging range. In addition, after completion of the establishment of the three-dimensional coordinate model, it is also necessary to determine a coordinate of the target unmanned device to be calibrated, and distances between all obstacles on the three-dimensional coordinate model and the target unmanned device.

The ranging method based on a laser radar system provided by the present disclosure is receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method of establishing a three-dimensional coordinate model by using ranging data measured by a plurality of laser radars, and determining a distance between a target unmanned driving device and an obstacle according to the three-dimensional coordinate model, of the present application can realize a ranging calibration task for a larger distance range, thereby effectively improving a calibration efficiency and accuracy of the visual image algorithm, compared with the existing method of ranging calibration of the visual image algorithm by a single laser radar.

Preferably, in other optional embodiment, the ranging data further includes time stamps of the laser radars, the time stamps is used to indicate moments when distances are obtained by measuring via the laser radars. Therefore, in present embodiment, the ranging device based on a laser radar system uses time stamps in the ranging data to select out a distance obtained at the same measurement moment, and establishes a three-dimensional coordinate model at this moment, and then a three-dimensional coordinate model at each measurement moment is obtained, that is, establishing a dynamic three-dimensional coordinate model with a time axis as a dimension, thereby providing more accurate data for calibrating the visual image algorithm model carried on the unmanned device.

Preferably, in other optional embodiment, the plurality of laser radars includes a target laser radar installed on the target unmanned device. Establishing the three-dimensional coordinate model according to the ranging data may specifically include: establishing a three-dimensional coordinate system with a location of the target unmanned device as an origin, according to a target ranging data obtained by the target laser radar installed on the target unmanned device;

determining a coordinate of other laser radar and a coordinate of each obstacle in a measurement range of the other laser radar according to other ranging data except the target ranging data in the ranging data, to obtain the three-dimensional coordinate model, where the other laser radar is a laser radar except the target laser radar among the plurality of laser radars of the laser radar system. In this embodiment, in order to improve the efficiency of establishing the three-dimensional coordinate model so as to improve the calibration efficiency, one laser radar in the laser radar system may be disposed on the target unmanned device, so that position of the target laser radar and position of the target unmanned device are coincident, improving processing efficiency of the ranging data, and thus improving establishment efficiency of establishing the three-dimensional coordinate model.

The ranging method based on a laser radar system provided by the present disclosure is receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method of establishing a three-dimensional coordinate model by using ranging data measured by a plurality of laser radars, and determining a distance between a target unmanned driving device and an obstacle according to the three-dimensional coordinate model, of the present application can realize a ranging calibration task for a larger distance range, thereby effectively improving a calibration efficiency and accuracy of the visual image algorithm, compared with the existing method of ranging calibration of the visual image algorithm by a single laser radar.

Figure 3:
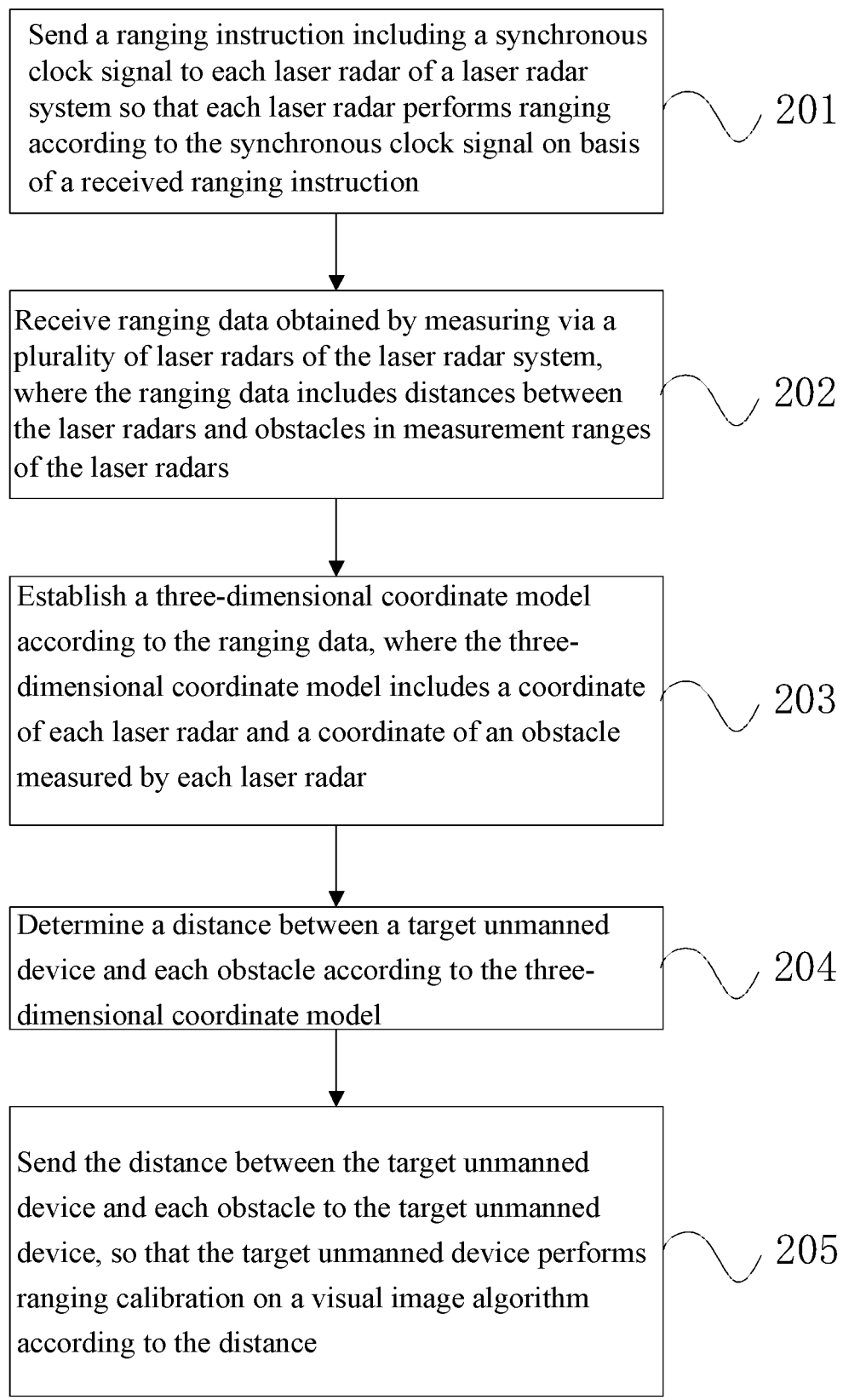
FIG. 3 is a schematic flow chart of a ranging method based on a laser radar system according to Embodiment II of the present disclosure.

On basis of Embodiment I, FIG. 3 is a schematic flow chart of a ranging method based on a laser radar system according to Embodiment II of the present disclosure.

As shown in FIG. 3, the ranging method based on a laser radar system includes:

Step 201: send a ranging instruction including a synchronous clock signal to each laser radar of a laser radar system so that each laser radar performs ranging according to the synchronous clock signal on basis of a received ranging instruction.

Step 202: receive ranging data obtained by measuring via a plurality of laser radars of the laser radar system, where the ranging data includes distances between the laser radars and obstacles in measurement ranges of the laser radars.

Step 203: establish a three-dimensional coordinate model according to the ranging data, where the three-dimensional coordinate model includes a coordinate of each laser radar and a coordinate of an obstacle measured by each laser radar.

Step 204: determine a distance between a target unmanned device and each obstacle according to the three-dimensional coordinate model.

Step 205: send the distance between the target unmanned device and each obstacle to the target unmanned device, so that the target unmanned device performs ranging calibration on a visual image algorithm according to the distance.

The laser radar system on which the present embodiment is based includes a plurality of laser radars, each of which can independently perform a ranging task. Where the plurality of laser radars may include a fixedly installed laser radar and/or a laser radar installed on each unmanned device.

Different from Embodiment I, in Embodiment II, the ranging device of the laser radar system first sends a ranging instruction including a synchronous clock signal to each laser radar of the laser radar system so that each laser radar performs ranging according to the synchronous clock signal included in a received ranging instruction. Subsequently, similar to Embodiment I, the ranging device based on a laser radar will receive the ranging data obtained by measuring via each laser radar, where the ranging data sent by each laser radar includes a distance between each laser radar itself and each obstacle obtained by measuring via each laser radar within its measurement range. The ranging data obtained in this way has high synchronism, improving effectively measurement precision. Preferably, in Embodiment II, the ranging device based on a laser radar system sends the ranging instruction to each laser radar according to a preset time period.

Subsequently, a three-dimensional coordinate model can be established according to the obtained distances, where the three-dimensional coordinate model includes a coordinate of each laser radar and a coordinate of an obstacle measured by each laser radar. Finally, a distance between a target unmanned device and each obstacle can be determined according to the three-dimensional coordinate model.

Specifically, in the present application, since a laser radar system including a plurality of laser radars is used for ranging, and the plurality of laser radars are located at different positions, a three-dimensional coordinate model can be established by obtaining ranging data measured by the laser radars, where the three-dimensional coordinate model may include a coordinate of each laser radar and its measurable obstacle. Of course, when establishing the three-dimensional coordinate model, it is necessary to combine the ranging data so as to determine a coordinates of the same obstacle or the same laser radar; that is, for a certain obstacle, distances measured by different laser radars are different. Therefore, when integrating the ranging data, it is possible to refer to obstacles whose distances are measured by the plurality of laser radars so as to achieve establishment of the three-dimensional coordinate model, thereby obtaining a position system with a large ranging range. In addition, after completion of the establishment of the three-dimensional coordinate model, it is also necessary to determine a coordinate of the target unmanned device to be calibrated, and distances between all obstacles on the three-dimensional coordinate model and the target unmanned device.

Finally, the ranging device based on a laser radar system sends the distance between the target unmanned device and each obstacle to the target unmanned device, so that the target unmanned device performs ranging calibration on a visual image algorithm according to the distance.

Preferably, in other optional embodiment, the ranging data further includes time stamps of the laser radars, the time stamp is used to indicate moments when distances are obtained by measuring via the laser radars. Therefore, in present embodiment, the ranging device based on a laser radar system uses time stamps in the ranging data to select out a distance obtained at the same measurement moment, and establishes a three-dimensional coordinate model at this moment, and then a three-dimensional coordinate model at each measurement moment is obtained, that is, establishing a dynamic three-dimensional coordinate model with a time axis as a dimension, thereby providing more accurate data for calibrating the visual image algorithm model carried on the unmanned device.

Preferably, in other optional embodiment, the plurality of laser radars includes a target laser radar installed on the target unmanned device. Establishing the three-dimensional coordinate model according to the ranging data may specifically include: establishing a three-dimensional coordinate system with a location of the target unmanned device as an origin, according to a target ranging data obtained by the target laser radar installed on the target unmanned device; determining a coordinate of other laser radar and a coordinate of each obstacle in a measurement range of the other laser radar according to other ranging data except the target ranging data in the ranging data, to obtain the three-dimensional coordinate model, where the other laser radar is a laser radar except the target laser radar among the plurality of laser radars of the laser radar system. In this embodiment, in order to improve the efficiency of establishing the three-dimensional coordinate model so as to improve the calibration efficiency, one laser radar in the laser radar system may be disposed on the target unmanned device, so that position of the target laser radar and position of the target unmanned device are coincident, improving processing efficiency of the ranging data, and thus improving establishment efficiency of establishing the three-dimensional coordinate model.

The ranging method based on a laser radar system provided in the present disclosure is receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method of establishing a three-dimensional coordinate model by using ranging data measured by a plurality of laser radars, and determining a distance between a target unmanned driving device and an obstacle according to the three-dimensional coordinate model, of the present application can realize a ranging calibration task for a larger distance range, thereby effectively improving a calibration efficiency and accuracy of the visual image algorithm, compared with the existing method of ranging calibration of the visual image algorithm by a single laser radar.

Figure 4:
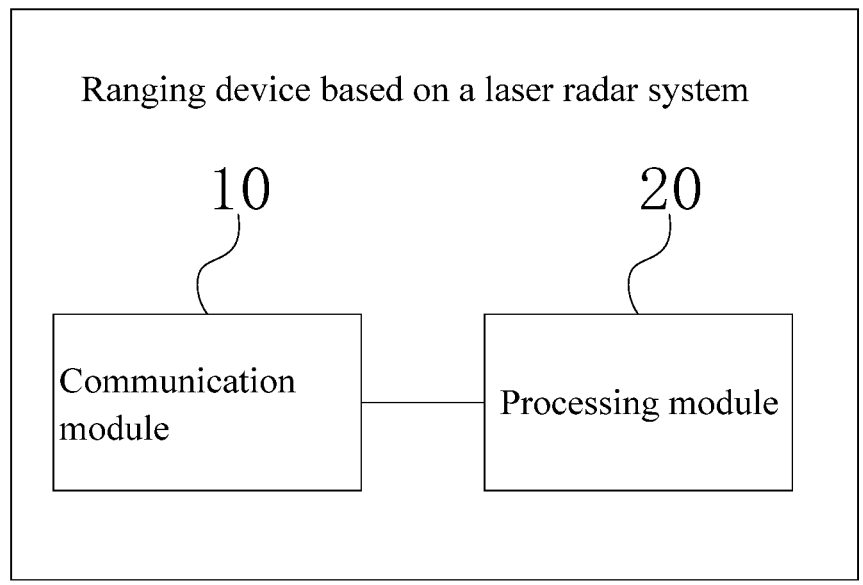
FIG. 4 is a schematic structural diagram of a ranging device based on a laser radar system according to Embodiment III of the present disclosure.

FIG. 4 is a schematic structural diagram of a ranging device based on a laser radar system according to Embodiment III of the present disclosure. As shown in FIG. 4, the ranging device based on a laser radar system includes:

a communication module 10, configured to receive ranging data obtained by measuring via a plurality of laser radars of the laser radar system, where the ranging data includes distances between the laser radars and obstacles in measurement ranges of the laser radars; and a processing module 20, configured to establish a three-dimensional coordinate model according to the ranging data, where the three-dimensional coordinate model includes a coordinate of each laser radar and a coordinate of an obstacle measured by each laser radar; and determine a distance between a target unmanned device and each obstacle according to the three-dimensional coordinate model.

In an optional embodiment, the communication module 10 is connected to the plurality of laser radars by means of wireless communication, where the plurality of laser radars includes a fixedly installed laser radar and/or a laser radar installed on each unmanned device.

In an optional embodiment, the ranging data further includes time stamps of the laser radars, where the time stamps is used to indicate moments when distances are obtained by measuring via the laser radars; and the processing module 20 is specifically configured to establish a three-dimensional coordinate model at each moment according to a time stamp of each ranging data.

In an optional embodiment, the plurality of laser radars includes a target laser radar installed on the target unmanned device; and the processing module 20 is specifically configured to establish a three-dimensional coordinate system with a location of the target unmanned device as an origin, according to a target ranging data obtained by the target laser radar installed on the target unmanned device; and determine a coordinates of other laser radar and a coordinate of each obstacle in a measurement range of the other laser radar according to other ranging data except the target ranging data in the ranging data, to obtain a three-dimensional coordinate model; where the other laser radar is a laser radar except the target laser radar among the plurality of laser radars of the laser radar system.

In an optional embodiment, after the distance between the target unmanned device and each obstacle according to the three-dimensional coordinate model is determined, the communication module 10 is further configured to send the distance between the target unmanned device and each obstacle to the target unmanned device, so that the target unmanned device performs ranging calibration on a visual image algorithm according to the distance.

In an optional embodiment, before receiving the ranging data obtained by measuring via the plurality of laser radars of the laser radar system, the communication module 10 is further configured to send a ranging instruction including a synchronous clock signal to each laser radar of the laser radar system so that each laser radar performs ranging according to the synchronous clock signal on basis of the received ranging instruction.

In an optional embodiment, the communication module 10 is configured to send the ranging instruction to each laser radar according to a preset time period.

A person skilled in the art can clearly understand that for convenience and brevity of the description, a specific working process of the system described above and corresponding beneficial effects can refer to the corresponding processes in the foregoing method embodiments, and details are not repeated here.

The ranging device based on a laser radar system provided in the present disclosure is receiving ranging data obtained by measuring via a plurality of laser radars of a laser radar system, where the ranging data includes distances between the laser radars and obstacles in measurement ranges of the laser radars; establishing a three-dimensional coordinate model according to the ranging data; and determining a distance between a target unmanned device and each obstacle according to the three-dimensional coordinate model. The ranging method of establishing a three-dimensional coordinate model by using ranging data measured by a plurality of laser radars, and determining a distance between a target unmanned driving device and an obstacle according to the three-dimensional coordinate model, of the present application can realize a ranging calibration task for a larger distance range, thereby effectively improving a calibration efficiency and accuracy of the visual image algorithm, compared with the existing method of ranging calibration of the visual image algorithm by a single laser radar.

Figure 5:
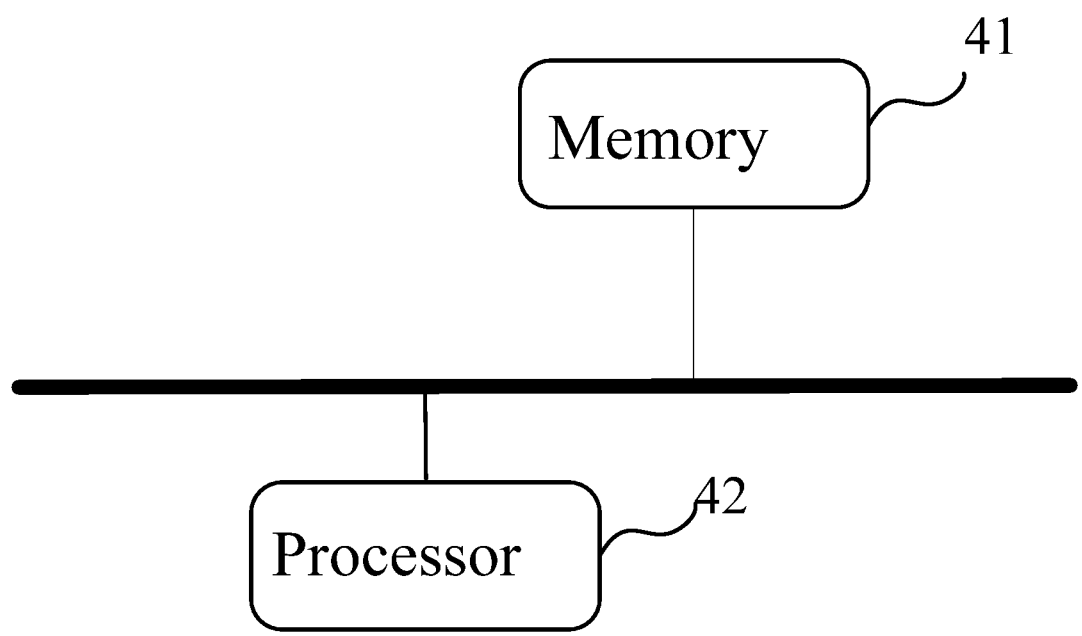
FIG. 5 is a schematic structural diagram of hardware of a ranging device based on a laser radar system according to Embodiment IV of the present disclosure.

FIG. 5 is a schematic structural diagram of hardware of a ranging device based on a laser radar system according to Embodiment IV of the present disclosure. As shown in FIG. 5, the ranging device based on a laser radar system includes a memory 41, a processor 42 and a computer program stored on the memory 41 and runnable on the processor 42, where the method of any one of the above embodiments is executed when the processor 42 runs the computer program.

The present disclosure also provides a readable storage medium including a program, when the program runs on a terminal, the terminal performs the method of any one of the above embodiments.

One of ordinary skill in the art will appreciate that all or part of the steps to implement the method embodiments described above may be accomplished by a hardware associated with a program instruction. The program can be stored in a computer readable storage medium. The program, when executed, performs the steps of the method embodiments; and the foregoing storage medium includes any medium that can store a program code, such as a ROM, a RAM, a magnetic disk or an optical disk.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or replacements do not make essence of the corresponding technical solutions deviate from the scope of technical solutions of the embodiments of the present disclosure.

What is claimed is:

1. A ranging method based on a laser radar system, comprising:
   receiving ranging data obtained by measuring via a plurality of laser radars of the laser radar system, wherein the ranging data comprises distances between the laser radars and obstacles in measurement ranges of the laser radars;
   establishing a three-dimensional coordinate model according to the ranging data, wherein the three-dimensional coordinate model comprises a coordinate of each laser radar and a coordinate of an obstacle measured by each laser radar; and
   determining a distance between a target unmanned device and each obstacle according to the three-dimensional coordinate model;
   wherein the plurality of laser radars comprises a target laser radar installed on the target unmanned device;
   the establishing a three-dimensional coordinate model according to the ranging data comprises:
   establishing a three-dimensional coordinate system with a location of the target unmanned device as an origin, according to a target ranging data obtained by the target laser radar installed on the target unmanned device; and
   determining a coordinate of other laser radar and a coordinate of each obstacle in a measurement range of the other laser radar according to other ranging data except the target ranging data in the ranging data, to obtain the three-dimensional coordinate model, wherein the other laser radar is a laser radar except the target laser radar among the plurality of laser radars of the laser radar system.

2. The ranging method based on a laser radar system according to claim 1, wherein the plurality of laser radars comprises at least one of a fixedly installed laser radar and a laser radar installed on each unmanned device.

3. The ranging method based on a laser radar system according to claim 1, wherein the ranging data further comprises time stamps of the laser radars, wherein the time stamps are used to indicate moments when distances are obtained by measuring via the laser radars;
   correspondingly, the establishing a three-dimensional coordinate model according to the ranging data comprises:
   establishing a three-dimensional coordinate model at each moment according to a time stamp of each ranging data.

4. The ranging method based on a laser radar system according to claim 1, wherein after the determining a distance between a target unmanned device and each obstacle according to the three-dimensional coordinate model, further comprising:
   sending the distance between the target unmanned device and each obstacle to the target unmanned device, so that the target unmanned device performs ranging calibration on a visual image algorithm according to the distance.

5. The ranging method based on a laser radar system according to claim 1, wherein before the receiving ranging data obtained by measuring via a plurality of laser radars of the laser radar system, further comprising:
   sending a ranging instruction comprising a synchronous clock signal to each laser radar of the laser radar system so that each laser radar performs ranging according to the synchronous clock signal on basis of a received ranging instruction.

6. The ranging method based on a laser radar system according to claim 5, wherein the ranging instruction is sent to each laser radar according to a preset time period.

7. A ranging device based on a laser radar system, comprising: a processor and a non-transitory computer-readable medium for storing program codes, which, when executed by the processor, cause the processor to:
   receive ranging data obtained by measuring via a plurality of laser radars of the laser radar system, wherein the ranging data comprises distances between the laser radars and obstacles in measurement ranges of the laser radars; and
   establish a three-dimensional coordinate model according to the ranging data, wherein the three-dimensional coordinate model comprises a coordinate of each laser radar and a coordinate of an obstacle measured by each laser radar; and determine a distance between a target unmanned device and each obstacle according to the three-dimensional coordinate model;
   wherein the plurality of laser radars comprise a target laser radar installed on the target unmanned device; and
   the program codes further cause the processor to establish a three-dimensional coordinate system with a location of the target unmanned device as an origin, according to a target ranging data obtained by the target laser radar installed on the target unmanned device; and determine a coordinates of other laser radar and a coordinate of each obstacle in a measurement range of the other laser radar according to other ranging data except the target ranging data in the ranging data, to obtain a three-dimensional coordinate model; wherein the other laser radar is a laser radar except the target laser radar among the plurality of laser radars of the laser radar system.

8. The ranging device based on a laser radar system according to claim 7, wherein the program codes further cause the processor to connect to the plurality of laser radars by wireless communication, wherein the plurality of laser radars comprise at least one of a fixedly installed laser radars and a laser radar installed on each unmanned device.

9. The ranging device based on a laser radar system according to claim 7, wherein the ranging data further comprises time stamps of the laser radars, wherein the time stamps are used to indicate moments when distances are obtained by measuring via the laser radars; and the program codes further cause the processor to establish a three-dimensional coordinate model at each moment according to a time stamp of each ranging data.

10. The ranging device based on a laser radar system according to claim 7, wherein after the distance between the target unmanned device and each obstacle according to the three-dimensional coordinate model is determined, the program codes further cause the processor to send the distance between the target unmanned device and each obstacle to the target unmanned device, so that the target unmanned device performs ranging calibration on a visual image algorithm according to the distance.

11. The ranging device based on a laser radar system according to claim 7, wherein before receiving the ranging data obtained by measuring via the plurality of laser radars of the laser radar system, the program codes further cause the processor to send a ranging instruction comprising a synchronous clock signal to each laser radar of the laser radar system so that each laser radar performs ranging according to the synchronous clock signal on basis of the received ranging instruction.

12. The ranging device based on a laser radar system according to claim 11, wherein the program codes further cause the processor to send the ranging instruction to each laser radar according to a preset time period.

13. A ranging device based on a laser radar system, comprising: a memory, a processor coupled to the memory, and a computer program stored on the memory and runnable on the processor, wherein the method according to claim 1 is executed when the processor runs the computer program.

14. A non-transitory readable storage medium, comprising a program, and when the program is executed on a terminal, the terminal executes the method according to claim 1.

* * * * *